United States Patent
Kwon et al.

(10) Patent No.: US 8,537,269 B2
(45) Date of Patent: Sep. 17, 2013

(54) METHOD, MEDIUM, AND APPARATUS FOR SETTING EXPOSURE TIME

(75) Inventors: Jae-hyun Kwon, Yongin-si (KR); Won-hee Choe, Gyeongiu-si (KR); Seong-deok Lee, Suwon-si (KR); Hyun-chul Song, Seoul (KR); Kang-eui Lee, Yongin-si (KR)

(73) Assignees: Samsung Electronics Co., Ltd., Suwon-Si (KR); Samsung Electro-Mechanics Co., Ltd., Suwon (KR)

( * ) Notice: Subject to any disclaimer, the term of this patent is extended or adjusted under 35 U.S.C. 154(b) by 936 days.

(21) Appl. No.: 12/222,914

(22) Filed: Aug. 19, 2008

(65) Prior Publication Data

US 2009/0073306 A1 Mar. 19, 2009

(30) Foreign Application Priority Data

Sep. 13, 2007 (KR) .................. 10-2007-0093302

(51) Int. Cl.
*H04N 5/235* (2006.01)
*H04N 5/335* (2011.01)
*G03B 3/00* (2006.01)

(52) U.S. Cl.
USPC .............................. 348/362; 348/296; 396/96

(58) Field of Classification Search
USPC .............. 348/362, 229.1, 296, 297, 301, 308; 396/96
See application file for complete search history.

(56) References Cited

U.S. PATENT DOCUMENTS

| | | | | |
|---|---|---|---|---|
| 6,665,010 | B1 * | 12/2003 | Morris et al. ................. | 348/297 |
| 6,950,141 | B2 * | 9/2005 | Mori et al. .................... | 348/362 |
| 7,190,403 | B2 * | 3/2007 | Yamashita et al. ............ | 348/364 |
| 7,538,794 | B2 * | 5/2009 | Turley et al. ................ | 348/208.1 |
| 7,830,435 | B2 * | 11/2010 | Guidash ........................ | 348/297 |
| 2005/0212955 | A1 * | 9/2005 | Craig et al. ................... | 348/362 |
| 2007/0229698 | A1 * | 10/2007 | Kakinuma et al. ............ | 348/362 |
| 2009/0040364 | A1 * | 2/2009 | Rubner ......................... | 348/362 |

FOREIGN PATENT DOCUMENTS

| | | |
|---|---|---|
| JP | 2002084449 | 3/2002 |
| JP | 2003259200 | 9/2003 |
| JP | 2004159211 | 6/2004 |
| KR | 1020060023291 | 3/2006 |
| KR | 1020070026270 | 3/2007 |

* cited by examiner

*Primary Examiner* — Trung Diep
(74) *Attorney, Agent, or Firm* — Staas & Halsey LLP (57) ABSTRACT

A method, medium, and apparatus for setting an exposure time is provided. The apparatus includes a section setting module which sets one or more luminance sections based on a luminance distribution of an input image, an image division module which divides the input image into two or more regions, a region classification module which classifies the regions into the luminance sections, and an exposure-time setting module which sets an exposure time for each of the regions with reference to a target luminance value, the target luminance value being set based on the results of the classification performed by the region classification module.

35 Claims, 5 Drawing Sheets

METHOD, MEDIUM, AND APPARATUS FOR SETTING EXPOSURE TIME

CROSS-REFERENCE TO RELATED APPLICATIONS

This application claims priority from Korean Patent Application No. 10-2007-0093302 filed on Sep. 13, 2007 in the Korean Intellectual Property Office, the disclosure of which is incorporated herein by reference in its entirety.

BACKGROUND

1. Field

One or more embodiments of the present invention relate to a method, medium, and apparatus for setting an exposure time, and more particularly, to a method, medium, and apparatus for setting an exposure time, in which an input image is divided into one or more regions classified into a number of groups according to image information of the regions, a target value is set based on image information of a number of regions classified into one of the groups, and an exposure time is set for each of the regions based on the target value.

2. Description of the Related Art

With the recent advancements made in Internet technologies and the advent of various types of multimedia data, image information has become one of the most important parts of information that is transmitted over the Internet. Even though the importance of moving images as part of visual information has steadily grown due to the advent of various user-created contents (UCCs), the dependence of visual image on still images is still high. Due to the digitalization of increasing number of photographing devices, image sensors have been widely used in photographing devices. As a result of research conducted on image sensors for the past twenty years, digital cameras nowadays are provided with image sensors with 10 megapixels or more, while camera phones are provided with 5-megapixel cameras. However, there is a limit to achieving high resolution enough to clearly render detailed images. Therefore, research has been conducted to determine ways to expand the dynamic range of image sensors, since image sensors are one of the most important factors that affect human visual perception. Technologies which consider human visual perception focus more on how to provide images that can be better seen by the human eye.

Conventional image sensors used in digital cameras, camera phones or digital camcorders generally have a limited dynamic range of less than 60 dB. Thus, the color and picture quality of images captured by such image sensors are deficient compared to the more sensitive dynamic range of the human vision, which is about 100 dB.

The dynamic range of an image sensor may be increased by using either a hardware-based method or a software-based method. The hardware-based method of increasing the dynamic range of an image sensor includes making physical modifications to the image sensor, e.g., modifying the structure of the image sensor or changing color filters, thus enabling the image sensor to receive as much light as possible with increased sensitivity. In addition, the hardware-based method of increasing the dynamic range of an image sensor can increase the sensitivity of the image sensor so that the image sensor can detect even a small amount of light. However, the hardware-based method of increasing the dynamic range of an image sensor also increases the size and manufacturing cost of the image sensor.

In order to address the problems associated with the hardware-based method of increasing the dynamic range of an image sensor, a method has been suggested that involves capturing two or more images using a conventional image sensor and using different exposure times, and compensating the shortage of information by synthesizing the captured images. However, this method requires the exposure times respectively corresponding to the captured images to have an appropriate difference therebetween. To achieve this appropriate difference in exposure times, it is very important to appropriately set the exposure time.

SUMMARY

One or more embodiments of the present invention provide a method, medium, and apparatus for setting an exposure time, in which an input image is divided into one or more regions classified into a number of groups according to image information of the regions, a target value is set based on image information of a number of regions classified into one of the groups, and an exposure time is set for each of the regions based on the target value.

One or more embodiments of the present invention also provide a method, medium, and apparatus for setting an exposure time, in which it is possible to prevent the occurrence of a blur phenomenon and thus to reduce the exposure time by amplifying the values of pixels of an image.

Additional aspects and/or advantages will be set forth in part in the description which follows and, in part, will be apparent from the description, or may be learned by practice of the invention.

According to an aspect of the present invention, there is provided an apparatus for setting an exposure time, the apparatus including: a section setting module which sets one or more luminance sections based on a luminance distribution of an input image; an image division module which divides the input image into two or more regions; a region classification module which classifies the regions into the luminance sections; and an exposure-time setting module which sets an exposure time for each of the regions with reference to a target luminance value, the target luminance value being set based on the results of the classification performed by the region classification module.

According to another aspect of the present invention, there is provided a method of setting an exposure time, the method including: (a) setting one or more luminance sections based on a luminance distribution of an input image; (b) dividing the input image into two or more regions; (c) classifying the regions into the luminance sections; and (d) setting an exposure time for each of the regions with reference to a target luminance value, which is set based on the results of the classification performed by the region classification module.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Embodiments of the present invention relate to a method, medium, and apparatus for setting an exposure time, and more particularly, to a method, medium, and apparatus for setting an exposure time to obtain one or more images with different exposure times. When a photographing operation is performed using a typical digital camera in a back-light environment, a subject is likely to be rendered darker than it actually is and thus may not be recognized clearly since typical digital cameras determine the exposure time based on the average luminance of an image.

This phenomenon occurs because the intensity of signals obtained from the subject is weak, whereas the intensity of signals obtained from the background of the subject is strong. In this case, in order to obtain a high-dynamic range (HDR) image in which a subject and the background of the subject can both appear properly, two images of the subject may be captured using a long exposure time and a short exposure time, respectively, and then the captured two images may be synthesized.

Figure 1:
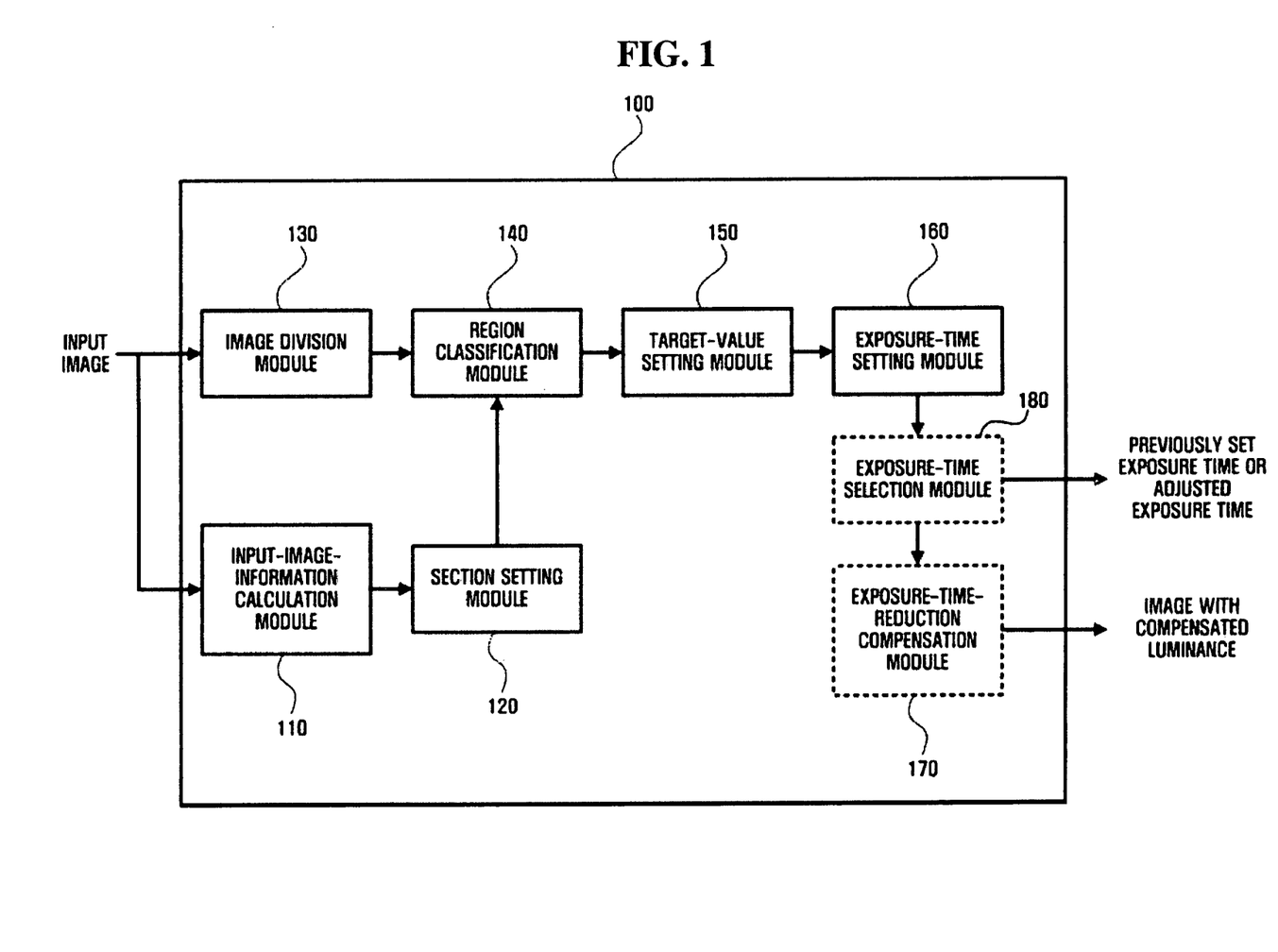
FIG. 1 illustrates a block diagram of an apparatus for setting an exposure time, according to an embodiment of the present invention.

FIG. 1 illustrates a block diagram of an apparatus 100 for setting an exposure time, according to an embodiment of the present invention. Herein, the term apparatus should be considered synonymous with the term system, and not limited to a single enclosure or all described elements embodied in single respective enclosures in all embodiments, but rather, depending on embodiment, is open to being embodied together or separately in differing enclosures and/or locations through differing elements, e.g., a respective apparatus/system could be a single processing element or implemented through a distributed network, noting that additional and alternative embodiments are equally available.

Referring to FIG. 1, the apparatus 100 includes an input-image-information calculation module 110, a section setting module 120, an image division module 130, a region classification module 140, a target-value setting module 150, an exposure-time setting module 160, an exposure-time-reduction compensation module 170 and an exposure-time selection module 180.

The input-image-information calculation module 110 receive an input image and calculates image information of the input image. The image information of the input image may be one of a minimum luminance value, an average luminance value and a maximum luminance value of the input image, but the present invention is not restricted to this.

The section setting module 120 receives the image information of the input image from the input-image-information calculation module 110 and set a number of sections based on the received image information. That is, the section setting module 120 may set one or more luminance sections based on the luminance distribution of the input image.

The image division module 130 divide the input image into two or more regions. The regions of the input image may have the same size, but the present invention is not restricted to this. The regions of the input image may be differentiated from one another by their relative locations with respect to the input image, but the present invention is not restricted to this.

The region classification module 140 receive the regions of the input image from the image division module 130, receive the sections from the section setting module 120, and classifies the regions of the input image into the sections. The classification of the regions of the input image will be described later in further detail with reference to FIG. 2.

Referring to FIG. 1, the input-image-information calculation module 110 directly receive the input image, and the region classification module 140 receives the regions of the input image from the image division module 130 and receive the luminance sections from the section setting module 120. However, the input-image-information calculation module 110 and the section setting module 120 may both be interposed between the image division module 130 and the region classification module 140. In this case, the image division module 130 may divide the input image into a number of regions, the input-image-information calculation module 110 may calculate image information of each of the regions obtained by the image division module 130, the section setting module 120 may set a number of luminance sections based on the image information obtained by the input-image-information calculation module 110, and the region classification module 140 may classify the regions obtained by the image division module 130 into the luminance sections set by the section setting module 120.

The target-value setting module 150 calculate a target luminance value using a number of regions of the input image that are classified into one of the luminance sections set by the section setting module 120. The operation of the target-value setting module 150 will hereinafter be described in further detail.

The target-value setting module 150 receives the regions of the input image that are classified into two or more luminance sections by the region classification module 140.

The luminance range of the input image may be divided into first, second and third luminance sections. Luminance values belonging to the third luminance section are all higher than luminance values belonging to the second luminance section, and the luminance values belonging to the second luminance section are all higher than luminance values belonging to the first luminance section.

The target-value setting module 150 calculate average luminance values of a number of regions classified into the second luminance section, and set the average of the average luminance values of the regions classified into the second luminance section as a target luminance value. Only some of the regions classified into the second luminance section may be used to determine the target luminance value.

The exposure-time setting module 160 receive the target luminance value determined by the target-value setting module 150 and calculate an exposure time for each of the regions of the input image. That is, the exposure-time setting module 160 may set an exposure time for each of the regions of the input image based on a target luminance value set according to the luminance distribution of a number of regions classified into the second luminance section. The setting of an exposure time will be described later in greater detail below with reference to FIGS. 3A and 3B.

Referring to FIG. 1, the apparatus 100 may also include the exposure-time-reduction compensation module 170.

The exposure-time-reduction compensation module 170 receive an image captured using an adjusted exposure time determined based on a target value, compensate for the luminance of the received image by as much as the difference between the adjusted exposure time and the exposure time set by the exposure-time setting module 160, and output the compensated image. The operation of the exposure-time-reduction compensation module 170 will be described later in greater detail below with reference to FIG. 4.

Referring to FIG. 1, the apparatus 100 may also include the exposure-time selection module 180.

The exposure-time selection module 180 receive an exposure time set by the exposure-time setting module 160 or an adjusted exposure time. Then, the exposure-time selection module 180 may selectively output the exposure time set by the exposure-time setting module 160 and the adjusted exposure time to the exposure-time-reduction compensation module 170. The exposure-time selection module 180 may select one of the exposure time set by the exposure-time setting module 160 and the adjusted exposure time for the exposure-time-reduction compensation module 170 according to the classification of the regions of the input image by the region classification module 140 or according to user input.

Figure 2:
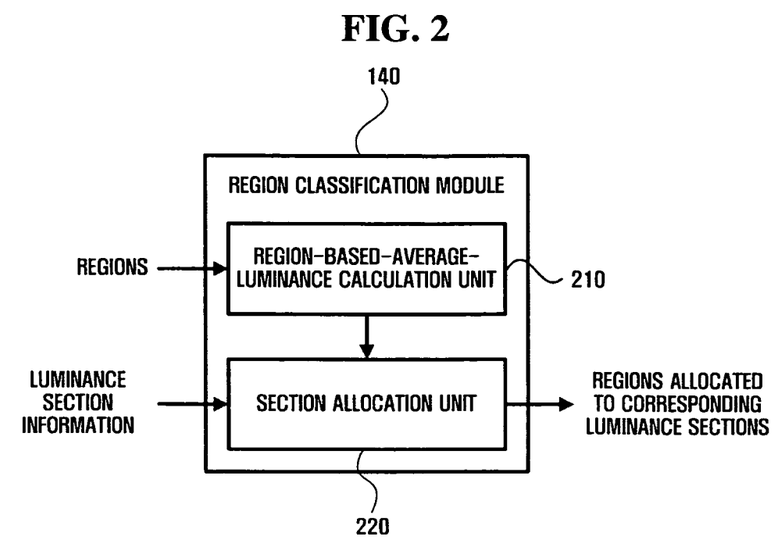
FIG. 2 illustrates a detailed block diagram of a region classification module shown in FIG. 1.

FIG. 2 illustrates a detailed block diagram of the image division module 140 illustrated in FIG. 1. Referring to FIG. 2, the image division module 140 include a region-based-average-luminance calculation unit 210 and a section allocation unit 220.

The region-based-average-luminance calculation unit 210 receive the regions of the input image from the image division module 130 and calculate average luminance values of the regions of the input image. The region-based-average-luminance calculation unit 210 may calculate an average luminance value of a region of the input image by dividing the sum of luminance values of pixels in the region by the number of pixels, but the present invention is not restricted to this.

The section allocation unit 220 receives the average luminance values of the regions of the input image from the region-based-average-luminance calculation unit 210, receive the luminance sections from the section setting module 120, and classifies the regions of the input image into the luminance sections according to the average luminance values of the regions of the input image.

Regions classified into a first luminance section will hereinafter be referred to as "first regions", regions classified into a second luminance section will hereinafter be referred to as "second region", and regions classified into a third luminance section will hereinafter be referred to as "third regions".

Figure 3A:
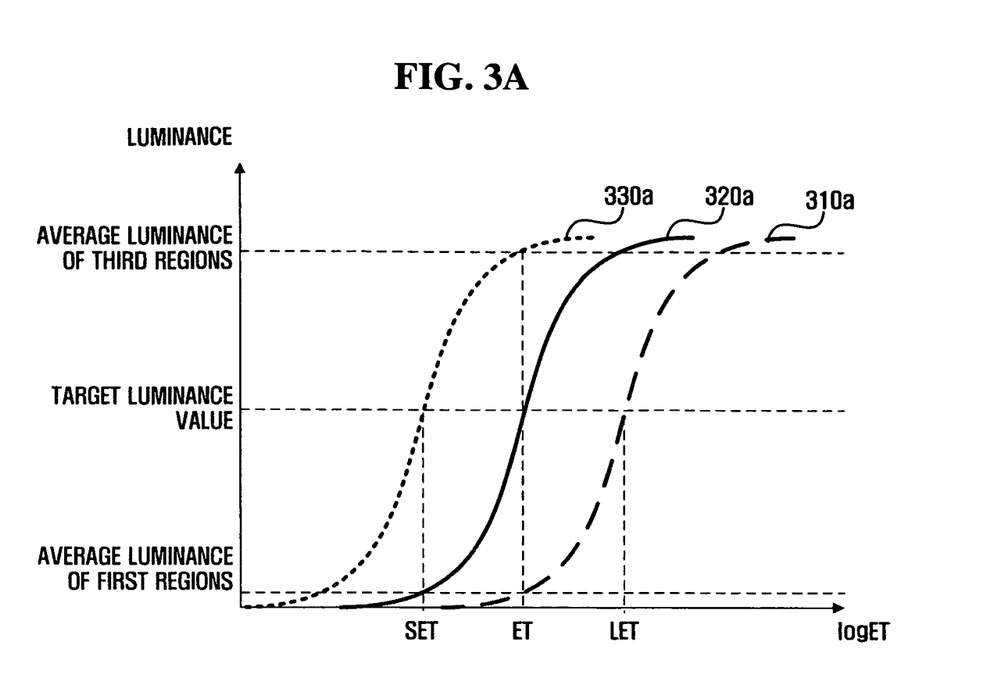
FIGS. 3A and 3B illustrate graphs of the relationship between exposure time and luminance, according to embodiments of the present invention.
Figure 3B:
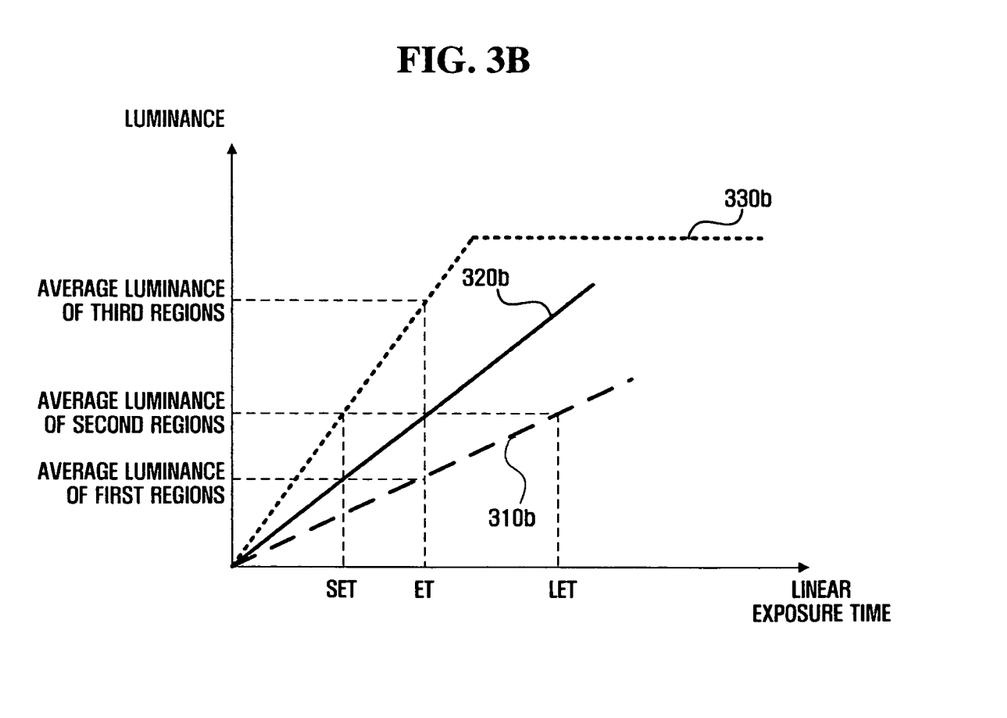

FIGS. 3A and 3B illustrate graphs of the relationship between exposure time and luminance, according to embodiments of the present invention.

Referring to FIG. 3A, a sensor response model of image sensors, which capture images, may be represented by the relational expression between a log value of exposure time and average luminance value. The sensor response model may vary from one image sensor to another, but is generally represented by an S-shaped graph. Referring to FIG. 3A, reference numeral 310A represents a sensor response model corresponding to a first luminance section, reference numeral 320A represents a sensor response model corresponding to a second luminance section, and reference numeral 330A represents a sensor response model corresponding to a third luminance section.

Third regions (i.e., bright regions) of an image captured by setting a camera to an ordinary exposure time ET may have a considerable amount of exposure, whereas first regions (i.e., dark regions) of the image may have only a small amount of exposure. Therefore, in order to reduce the average luminance of third regions to a predefined target luminance value, the exposure time must be reduced. On the other hand, in order to increase the average luminance of first regions to the predefined target luminance value, the exposure time must be increased.

When a target exposure time of third regions is defined as a short exposure time SET and then a lookup table that realizes a sensor response model is used, the short exposure time SET can be calculated by subtracting the difference between current exposure time and the short exposure time SET from the current exposure time.

Likewise, when a target exposure time of first regions is defined as a long exposure time LET and then the lookup table is used, the long exposure time LET can be calculated by adding the difference between current exposure time and the long exposure time to the current exposure time. An interpolation method may be used to estimate unknown values from neighboring known data included in the lookup table. A sensor response model may be represented by various types of relational expressions such as lookup tables or model functions indicating the relationship between exposure time and average luminance.

A sensor response model that can be represented by an S-shaped graph, as illustrated in FIG. 3A, may be defined, as indicated by Equation (1):

$$SET = ET_{AE} - (LUT_{SET} - LUT_{SET\_AVR})$$

$$LET = ET_{AE} - (LUT_{LET\_AVR} - LUT_{LET}) \quad (1)$$

where SET indicates a short exposure time, LET indicates a long exposure time, $ET_{AE}$ indicates an automatic exposure time, $LUT_{SET}$ indicates a short exposure time included in a lookup table, $LUT_{LET}$ indicates a long exposure time included in the lookup table, $LUT_{SET\_AVR}$ indicates the average of short exposure times included in the lookup table, and $LUT_{LET\_AVR}$ indicates the average of long exposure times included in the lookup table.

FIG. 3B illustrates a graph of the relationship between exposure time and luminance, according to an embodiment of the present invention. Referring to FIG. 3B, a linear model, instead of a sensor response model, may be used in a high-illumination environment. In this case, the average luminance of first, second or third regions may have a linear relationship with exposure time. Referring to FIG. 3B, reference numeral 310B represents a sensor response model corresponding to a first luminance section, reference numeral 320B represents a sensor response model corresponding to a second luminance section, and reference numeral 330B represents a sensor response model corresponding to a third luminance section.

$$SET = \frac{ET_{AE}}{REG_{Bright}} LUM_{Target} \quad (2)$$

$$LET = \frac{ET_{AE}}{REG_{Dark}} LUM_{Target}$$

Where SET indicates a short exposure time, LET indicates a long exposure time, $ET_{AE}$ indicates an automatic exposure time, $REG_{Bright}$ indicates a luminance value of a region classified into a third luminance section, $REG_{Dark}$ indicates a luminance value of a region classified into a first luminance section, and $LUM_{Target}$ indicates a target luminance value.

Figure 4:
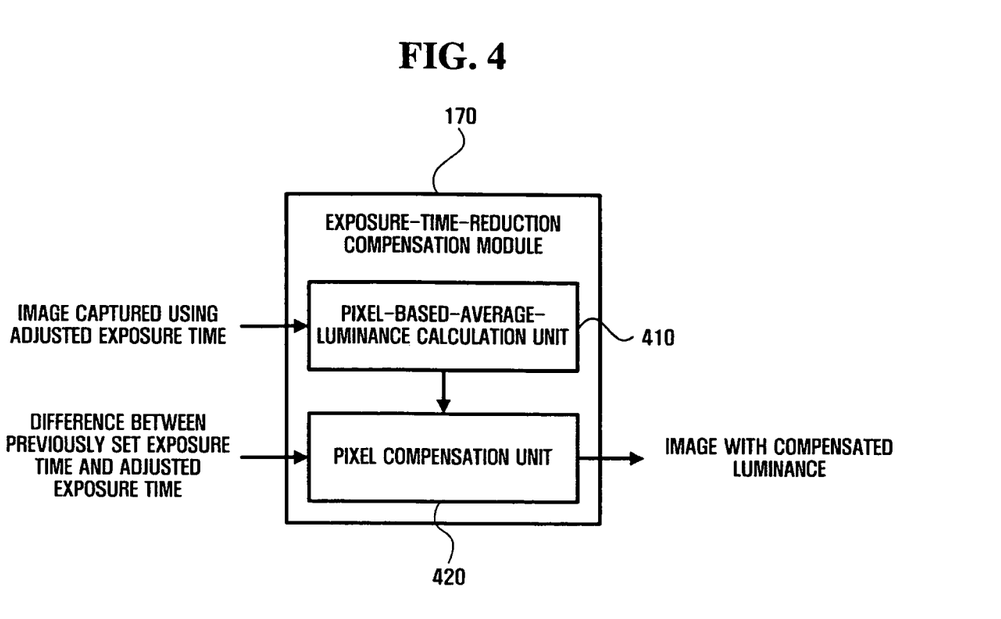
FIG. 4 illustrates a detailed block diagram of an exposure-time-reduction compensation module illustrated in FIG. 1.

FIG. 4 illustrates a detailed block diagram of the exposure-time-reduction compensation module 170 illustrated in FIG.

1. Referring to FIG. 4, the exposure-time-reduction compensation module 170 include a pixel-based-average-luminance calculation unit 410 and a pixel compensation unit 420.

The pixel-based-average-luminance calculation unit 410 receive an image captured using an adjusted exposure time, which is shorter than an exposure time that can meet a predefined target luminance value, and calculate an average luminance value of the received image.

The pixel compensation unit 420 compensate for the luminance of the received image by amplifying the luminance of the received image by the difference between the adjusted exposure time and the exposure time that can meet the predefined target luminance value. The luminance value of a predetermined pixel may be amplified by multiplying the luminance value of the predetermined pixel by a predefined coefficient, by adding the sum of the luminance values of pixels that surround the predetermined pixel to the luminance value of the predetermined pixel, or by adding the result of multiplying the sum of the luminance values of the surrounding pixels by a predefined coefficient to the luminance value of the predetermined pixel. In order to amplify the luminance value of a predetermined pixel, one to eight pixels that surround the predetermined pixel may be used. If each of the pixels of the received image has only one color channel value, as in a Bayer pattern, the amplification of the luminance of the received image may be performed in units of color groups into which the pixels of the received image are classified.

Figure 5:
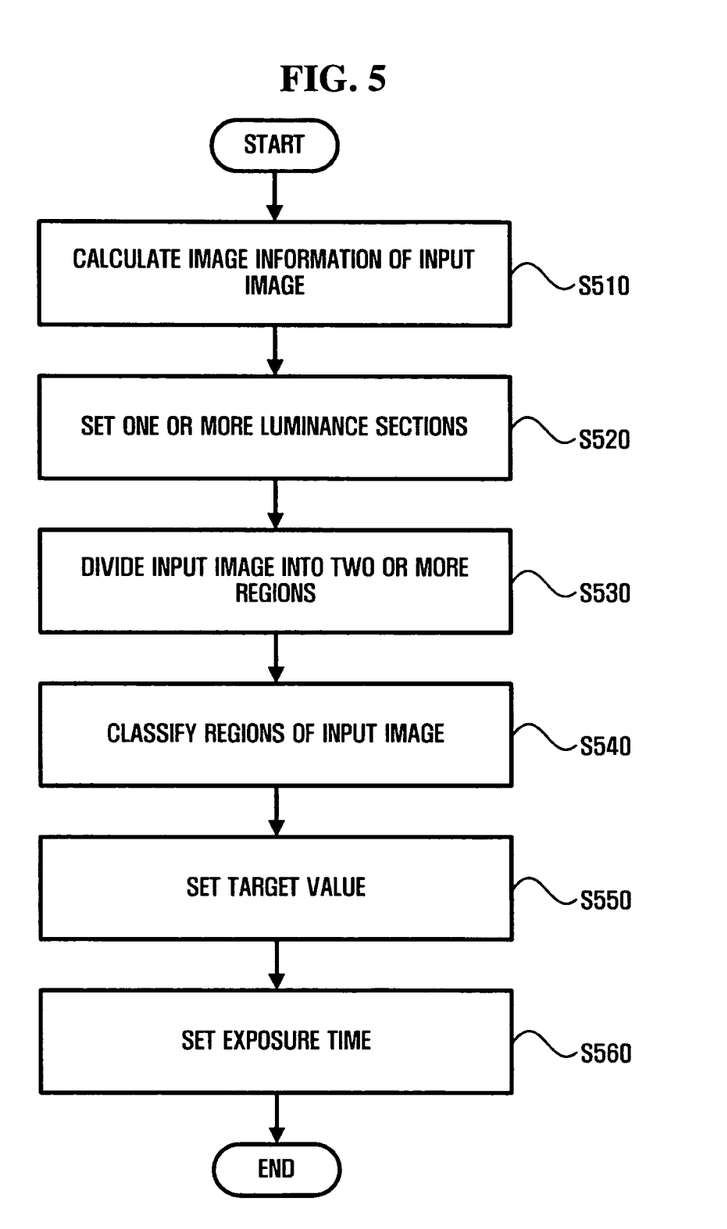
FIG. 5 illustrates a flowchart of a method of setting an exposure time, according to an embodiment of the present invention.

FIG. 5 illustrates of a flowchart of a method of setting an exposure time, according to an embodiment of the present invention. Referring to FIG. 5, the input-image-information calculation module 110 receives an input image and calculates image information of the input image (S510).

The image information of the input image may be one of an average luminance value, a minimum luminance value and a maximum luminance value of the input image.

Thereafter, the section setting module 120 receives the image information of the input image from the input-image-information calculation module 110 and sets one or more luminance sections, e.g., first through third luminance sections, based on the received image information (S520).

The setting of the luminance sections based on the luminance distribution of the input image will hereinafter be described in detail.

First, if the average luminance value of the input image is similar to the median of the minimum and maximum luminance values of the input image, the section setting module 120 may set a section between the minimum luminance value and the median of the minimum and maximum luminance values as the first luminance section, set a section between the median of the minimum and maximum luminance values and the median of the average and maximum luminance values as the second luminance section, and set a section between the median of the average and maximum luminance values and the maximum luminance value as the third luminance section.

Second, if the average luminance value of the input image is less than the median of the minimum and maximum luminance values of the input image, the section setting module 120 may set a section between the minimum luminance value and the average luminance value as the first luminance section, set a section between the average luminance value and the median of the minimum and maximum luminance values as the second luminance section, and set a section between the median of the minimum and maximum luminance values and the maximum luminance value as the third luminance section.

Third, if the average luminance value of the input image is greater than the median of the minimum and maximum luminance values of the input image, the section setting module 120 may set a section between the minimum luminance value and the median of the minimum and maximum luminance values as the first luminance section, set a section between the median of the minimum and maximum luminance values and the average luminance value as the second luminance section, and set a section between the average luminance value and the maximum luminance value as the third luminance section.

Thereafter, the image division module 130 divides the input image into one or more regions (S530).

The regions of the input image may have the same size or different sizes.

As soon as the input image is obtained, the input image may be divided into one or more regions.

Thereafter, the region classification module 140 receives the first, second and third luminance sections obtained by the section setting module 120, and classifies the regions of the input image into first regions, second regions or third regions according to the average luminance values of the regions of the input image (S540).

Thereafter, the target-value setting module 150 receives the results of the classification performed by the region classification module 140, calculates the average of the average luminance values of the second regions of the input image, and sets the result of the calculation as a target luminance value (S550).

Alternatively, the average of the average luminance values of some of the second regions of the input image or another numerical value chosen by a user may be set as the target luminance value.

Thereafter, the exposure-time setting module 160 receives the target luminance value and sets an exposure time that can meet the target luminance value (S560). The setting of an exposure time has already been described above with reference to FIGS. 3A and 3B, and thus, a detailed description thereof will be omitted.

It is possible to obtain the effect of reducing an exposure time using the exposure-time-reduction compensation module 170, instead of the exposure-time setting module 160. In the case of performing long-exposure photography, image information may easily be lost due to the shaking motion of the user's hands. In order to address this, the exposure time may be reduced, thereby preventing noise and motion blur.

The exposure-time-reduction compensation module 170 includes the pixel-based average luminance calculation unit 410 and the pixel compensation unit 420.

The pixel compensation unit 420 compensate for the luminance of an image by amplifying the luminance of the image by the difference between an adjusted exposure time and an exposure time that can meet a predefined target luminance value. The luminance value of a predetermined pixel may be amplified by multiplying the luminance value of the predetermined pixel by a predefined coefficient, by adding the sum of the luminance values of pixels that surround the predetermined pixel to the luminance value of the predetermined pixel, or by adding the result of multiplying the sum of the luminance values of the surrounding pixels by a predefined coefficient to the luminance value of the predetermined pixel. In order to amplify the luminance value of a predetermined pixel, one to eight pixels that surround the predetermined pixel may be used. If each of the pixels of an image has only one color channel value, as in a Bayer pattern, the amplification of the luminance of the image may be performed in units of color groups into which the pixels of the received image are classified.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

According to one or more embodiments of the present invention, an input image is divided into one or more regions, and a target value is determined using some of the regions. Thus, it is possible to set an exposure time that is for obtaining more than one image and that can meet the target value.

In addition, according to one or more embodiments of the present invention, it is possible to reduce the exposure time and thus to prevent a blur phenomenon from a long exposure by amplifying the value of each pixel using the values of a number of pixels that surround a corresponding pixel.

While aspects of the present invention have been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changed may be made in these embodiments without departing from the principles and spirit of the invention, the scope of which is defined in the claims and their equivalents.

What is claimed is:

1. An apparatus for setting an exposure time, the apparatus comprising:
    a section setting module which sets plural luminance sections based on a determined luminance distribution of an input image;
    an image division module which divides the input image into two or more regions;
    a region classification module which classifies the regions into the luminance sections based on respective analyses of luminance of each of the regions identifying which of the luminance sections each region should be classified into; and
    an exposure-time setting module which sets an exposure time for each of the regions with reference to a target luminance value of each respective region, the target luminance value being set based on the results of the classification performed by the region classification module,
    wherein the exposure time is set to obtain plural images with different exposure times, the plural images being synthesized.

2. An apparatus for setting an exposure time, the apparatus comprising:
    a section setting module which sets one or more luminance sections based on a luminance distribution of an input image;
    an image division module which divides the input image into two or more regions;
    a region classification module which classifies the regions into the luminance sections; and
    an exposure-time setting module which sets an exposure time for each of the regions with reference to a target luminance value of each respective region, the target luminance value being set based on the results of the classification performed by the region classification module, wherein the section setting module sets the luminance sections with reference to at least one of an average, a minimum and a maximum of luminance values of each pixel of the input image,
    wherein the exposure time is set to obtain plural images with different exposure times, the plural images being synthesized.

3. The apparatus of claim 2, wherein the section setting module sets the luminance sections according to a width of a luminance range of the input image.

4. The apparatus of claim 2, wherein, if the average luminance value is less than a median of the minimum luminance value and the maximum luminance value, the section setting module sets a section between the minimum luminance value and the average luminance value as a first luminance section, sets a section between the average luminance value and the median of the minimum luminance value and the maximum luminance value as a second luminance section, and sets a section between the median of the minimum luminance value and the maximum luminance value and the maximum luminance value as a third luminance section.

5. The apparatus of claim 2, wherein, if the average luminance value is greater than a median of the minimum luminance value and the maximum luminance value, the section setting module sets a section between the minimum luminance value and the median of the minimum luminance value and the maximum luminance value as a first luminance section, sets a section between the median of the minimum luminance value and the maximum luminance value and the average luminance value as a second luminance section, and sets a section between the average luminance value and the maximum luminance value as a third luminance section.

6. The apparatus of claim 2, wherein, if the average luminance value is similar to a median of the minimum luminance value and the maximum luminance value, the section setting module sets a section between the minimum luminance value and the median of the minimum luminance value and the maximum luminance value as a first luminance section, sets a section between the median of the minimum luminance value and the maximum luminance value and a median of the average luminance value and the maximum luminance value as a second luminance section, and sets a section between the median of the average luminance value and the maximum luminance value and the maximum luminance value as a third luminance section.

7. The apparatus of claim 1, wherein the image division module comprises:
    an uneven division unit which divides the input image into two or more regions having different sizes; and
    an even division unit which divides the input image into two or more regions having the same size.

8. The apparatus of claim 1, wherein the region classification module comprises:

a region-based average-luminance calculation unit which calculates respective average luminance values of the regions; and a section allocation unit which allocates one of the luminance sections to each of the regions with reference to the respective average luminance values.

9. The apparatus of claim 8, wherein the target luminance value comprises an average of the average luminance values of a number of regions classified into one of the luminance sections.

10. The apparatus of claim 1, wherein the exposure-time setting module comprises a target-luminance-value-equivalent-exposure-time setting unit which sets an amount of time taken to reach the target luminance value as the exposure time for each of the regions.

11. The apparatus of claim 1, further comprising:
a pixel-based average-luminance calculation module which receives an image captured using a reduced exposure time and calculates an average of luminance values of a plurality of pixels of the received image; and
a pixel compensation module which amplifies and thus compensates for a luminance of the received image by adding a luminance value of a reference pixel of each of the two or more regions and luminance values of a number of pixels that are adjacent to the reference pixel or by multiplying the luminance values of the pixels that are adjacent to the reference pixel by a predefined coefficient and adding the results of the multiplication to the luminance value of the reference pixel.

12. The apparatus of claim 11, wherein the exposure time for each of the regions is either an exposure time set by the exposure-time setting module or the reduced exposure time.

13. A method of setting an exposure time, the method comprising:
setting plural luminance sections based on a determined luminance distribution of an input image;
dividing the input image into two or more regions;
classifying the regions into the luminance sections based on respective analyses of luminance of each of the regions identifying which of the luminance sections each region should be classified into; and
setting an exposure time for each of the regions with reference to a target luminance value of each respective region, which is set based on the results of the classification performed by the classifying of the regions into the luminance sections,
wherein the exposure time is set to obtain plural images with different exposure times, the plural images being synthesized.

14. A method of setting an exposure time, the method comprising:
setting one or more luminance sections based on a luminance distribution of an input image;
dividing the input image into two or more regions;
classifying the regions into the luminance sections; and
setting an exposure time for each of the regions with reference to a target luminance value of each respective region, which is set based on the results of the classification performed by the classifying of the regions into the luminance sections,
wherein the setting of the plural luminance sections comprises setting the luminance sections with reference to at least one of an average, a minimum and a maximum of luminance values of each pixel of the input image,
wherein the exposure time is set to obtain plural images with different exposure times, the plural images being synthesized.

15. The method of claim 14, wherein the setting of the plural luminance sections further comprises setting the luminance sections according to a width of a luminance range of the input image.

16. The method of claim 14, wherein, if the average luminance value is less than a median of the minimum luminance value and the maximum luminance value, the setting of the plural luminance sections further comprises:
setting a section between the minimum luminance value and the average luminance value as a first luminance section;
setting a section between the average luminance value and the median of the minimum luminance value and the maximum luminance value as a second luminance section; and
setting a section between the median of the minimum luminance value and the maximum luminance value and the maximum luminance value as a third luminance section.

17. The method of claim 14, wherein, if the average luminance value is greater than a median of the minimum luminance value and the maximum luminance value, the setting of the plural luminance sections further comprises:
setting a section between the minimum luminance value and the median of the minimum luminance value and the maximum luminance value as a first luminance section;
setting a section between the median of the minimum luminance value and the maximum luminance value and the average luminance value as a second luminance section; and
setting a section between the average luminance value and the maximum luminance value as a third luminance section.

18. The method of claim 14, wherein, if the average luminance value is similar to a median of the minimum luminance value and the maximum luminance value, the setting of the plural luminance sections further comprises:
setting a section between the minimum luminance value and the median of the minimum luminance value and the maximum luminance value as a first luminance section;
setting a section between the median of the minimum luminance value and the maximum luminance value and a median of the average luminance value and the maximum luminance value as a second luminance section; and
setting a section between the median of the average luminance value and the maximum luminance value and the maximum luminance value as a third luminance section.

19. The method of claim 13, wherein the dividing of the input image comprises dividing the input image into two or more regions having different sizes or into two or more regions having the same size.

20. The method of claim 13, wherein the classifying of the regions comprises:
calculating respective average luminance values of the regions; and
allocating one of luminance sections to each of the regions with reference to the respective average luminance values.

21. The method of claim 20, wherein the target luminance value comprises an average of the average luminance values of a number of regions classified into one of the luminance sections.

22. The method of claim 13, wherein the setting of the exposure time comprises setting an amount of time taken to reach the target luminance value as the exposure time for each of the regions.

23. The method of claim 13, further comprising:
receiving an image captured using a reduced exposure time and calculating an average of luminance values of a plurality of pixels of the received image; and
amplifying and thus compensating for a luminance of the received image by adding a luminance value of a reference pixel of each of the two or more regions and luminance values of a number of pixels that are adjacent to the reference pixel or by multiplying the luminance values of the pixels that are adjacent to the reference pixel by a predefined coefficient and adding the results of the multiplication to the luminance value of the reference pixel.

24. The method of claim 23, wherein the exposure time for each of the regions is either an exposure time set by the setting of the exposure time or the reduced exposure time.

25. A photographing device having implemented the method of claim 13.

26. The apparatus of claim 1, wherein the section setting module sets the luminance sections with reference to at least one of an average, a minimum and a maximum of luminance values of each pixel of the input image.

27. The apparatus of claim 26, wherein the section setting module sets the luminance sections according to a width of a luminance range of the input image.

28. The apparatus of claim 26, wherein, if the average luminance value is less than a median of the minimum luminance value and the maximum luminance value, the section setting module sets a section between the minimum luminance value and the average luminance value as a first luminance section, sets a section between the average luminance value and the median of the minimum luminance value and the maximum luminance value as a second luminance section, and sets a section between the median of the minimum luminance value and the maximum luminance value and the maximum luminance value as a third luminance section.

29. The apparatus of claim 26, wherein, if the average luminance value is greater than a median of the minimum luminance value and the maximum luminance value, the section setting module sets a section between the minimum luminance value and the median of the minimum luminance value and the maximum luminance value as a first luminance section, sets a section between the median of the minimum luminance value and the maximum luminance value and the average luminance value as a second luminance section, and sets a section between the average luminance value and the maximum luminance value as a third luminance section.

30. The apparatus of claim 26, wherein, if the average luminance value is similar to a median of the minimum luminance value and the maximum luminance value, the section setting module sets a section between the minimum luminance value and the median of the minimum luminance value and the maximum luminance value as a first luminance section, sets a section between the median of the minimum luminance value and the maximum luminance value and a median of the average luminance value and the maximum luminance value as a second luminance section, and sets a section between the median of the average luminance value and the maximum luminance value and the maximum luminance value as a third luminance section.

31. The method of claim 13, wherein the setting of the plural luminance sections comprises setting the luminance sections with reference to at least one of an average, a minimum and a maximum of luminance values of each pixel of the input image.

32. The method of claim 31, wherein the setting of the plural luminance sections further comprises setting the luminance sections according to a width of a luminance range of the input image.

33. The method of claim 31, wherein, if the average luminance value is less than a median of the minimum luminance value and the maximum luminance value, the setting of the plural luminance sections further comprises:
setting a section between the minimum luminance value and the average luminance value as a first luminance section;
setting a section between the average luminance value and the median of the minimum luminance value and the maximum luminance value as a second luminance section; and
setting a section between the median of the minimum luminance value and the maximum luminance value and the maximum luminance value as a third luminance section.

34. The method of claim 31, wherein, if the average luminance value is greater than a median of the minimum luminance value and the maximum luminance value, the setting of the plural luminance sections further comprises:
setting a section between the minimum luminance value and the median of the minimum luminance value and the maximum luminance value as a first luminance section;
setting a section between the median of the minimum luminance value and the maximum luminance value and the average luminance value as a second luminance section; and
setting a section between the average luminance value and the maximum luminance value as a third luminance section.

35. The method of claim 31, wherein, if the average luminance value is similar to a median of the minimum luminance value and the maximum luminance value, the setting of the plural luminance sections further comprises:
setting a section between the minimum luminance value and the median of the minimum luminance value and the maximum luminance value as a first luminance section;
setting a section between the median of the minimum luminance value and the maximum luminance value and a median of the average luminance value and the maximum luminance value as a second luminance section; and
setting a section between the median of the average luminance value and the maximum luminance value and the maximum luminance value as a third luminance section.

* * * * *